United States Patent [19]
Wallgren

[11] 3,746,032
[45] July 17, 1973

[54] PNEUMATIC LIQUID DISPOSAL SYSTEM
[75] Inventor: Harald Anton Åke Wallgren, Alvsjo, Sweden
[73] Assignee: Aktiebolaget Electrolux, Stockholm, Sweden
[22] Filed: Aug. 4, 1971
[21] Appl. No.: 168,975

[30] Foreign Application Priority Data
Aug. 20, 1970 Sweden .................... 11331/70

[52] U.S. Cl. .................. 137/205, 4/10, 137/192, 137/399, 137/423
[51] Int. Cl. .......................................... F16k 31/18
[58] Field of Search ............... 4/1, 10; 137/192, 137/205, 399, 423

[56] References Cited
UNITED STATES PATENTS
| | | | |
|---|---|---|---|
| 3,628,194 | 12/1971 | Liljendahl | 4/10 |
| 3,224,460 | 12/1965 | Cann | 137/399 |
| 1,789,706 | 1/1931 | Kieselbach | 137/192 |
| 3,115,148 | 12/1963 | Liljendahl | 137/205 |
| 3,351,281 | 11/1967 | Keil | 137/192 X |
| 3,482,267 | 12/1969 | Liljendahl | 251/5 X |
| 2,796,883 | 6/1957 | Thompson | 137/399 |

Primary Examiner—Alan Cohan
Assistant Examiner—Gerald A. Michalsky
Attorney—Edmund A. Fenander

[57] ABSTRACT

Waste liquid is discharged pneumatically into a liquid disposal system through a discharge conduit from an outlet of a vessel which receives such waste liquid. Flow control mechanism is operatively associated with the discharge conduit which controls the flow of liquid from the vessel and normally functions to maintain the liquid level in the vessel at a level above the level of the outlet. When the flow control mechanism malfunctions and the liquid falls to a level at the vicinity of the outlet and at such time the discharge conduit is in communication with the system and at a partial vacuum, a body capable of floating in the liquid is drawn by suction toward the outlet in airtight sealing relation therewith, so that flow of air from the vessel into the system will be prevented.

17 Claims, 10 Drawing Figures

PNEUMATIC LIQUID DISPOSAL SYSTEM

BACKGROUND OF THE INVENTION

1. Field of the Invention

In pneumatic liquid disposal systems waste liquid flows from sanitary conveniences through branch conduits to a longer main conduit which is maintained at a partial vacuum. The sanitary conveniences operatively associated with each branch line form part of an operating unit of the liquid disposal system which includes a vessel in which waste liquid collects and from the outlet of which the liquid is discharged through a conduit into the branch line.

2. Description of the Prior Art

In pneumatic liquid disposal systems operating at a partial vacuum flow control mechanism is provided in the discharge conduit of each operating unit. Such flow control mechanism controls the flow of liquid from the outlet of the vessel of each operating unit to a branch line and normally functions to maintain the liquid level in the vessel at a level above the level of the outlet.

When the flow control mechanism malfunctions so that the discharge conduit remains in communication with the branch line and the liquid level in the vessel falls to the level of the outlet, air in the vessel can be drawn by suction into the discharge conduit and flow into the pneumatic liquid disposal system through the branch line. This is objectionable because the partial vacuum developed and maintained in the system will be impaired and can be inadequate to propel waste liquid pneumatically into other branch lines of the system from the vessels of other operating units in which such liquid collects.

SUMMARY OF THE INVENTION

My invention relates to structure which, in addition to the flow control mechanism normally associated with each operating unit of a pneumatic liquid disposal system, functions as a safety measure to prevent flow of air from a vessel of an operating unit into the system when the flow control mechanism malfunctions and a path of flow for such air is established from the outlet of the vessel through a discharge conduit into the system which is at a partial vacuum. Such additional structure functions independently of the control mechanism and is operable to prevent air in the vessel of an operating unit from flowing through the outlet thereof when the flow control mechanism malfunctions and the partial vacuum in the system becomes effective to draw such air into the system by suction from the vessel in which the liquid level has fallen to the level of the outlet.

I accomplish this by providing safety structure which comprises a body capable of floating in the liquid held in a vessel of an operating unit. When a partial vacuum develops at the outlet of the vessel and the liquid in the vessel falls to the level of the outlet the floating body is drawn by suction toward the outlet in airtight sealing relation therewith so that flow of air into the system will be prevented. By preventing flow of air into a pneumatic liquid disposal system in this manner from the outlet of a vessel forming a part of an operating unit of the system, the partial vacuum developed and maintained in the system to propel waste liquid therein from other operating units will not be impaired.

DESCRIPTION OF THE PREFERRED EMBODIMENT

Figure 1:
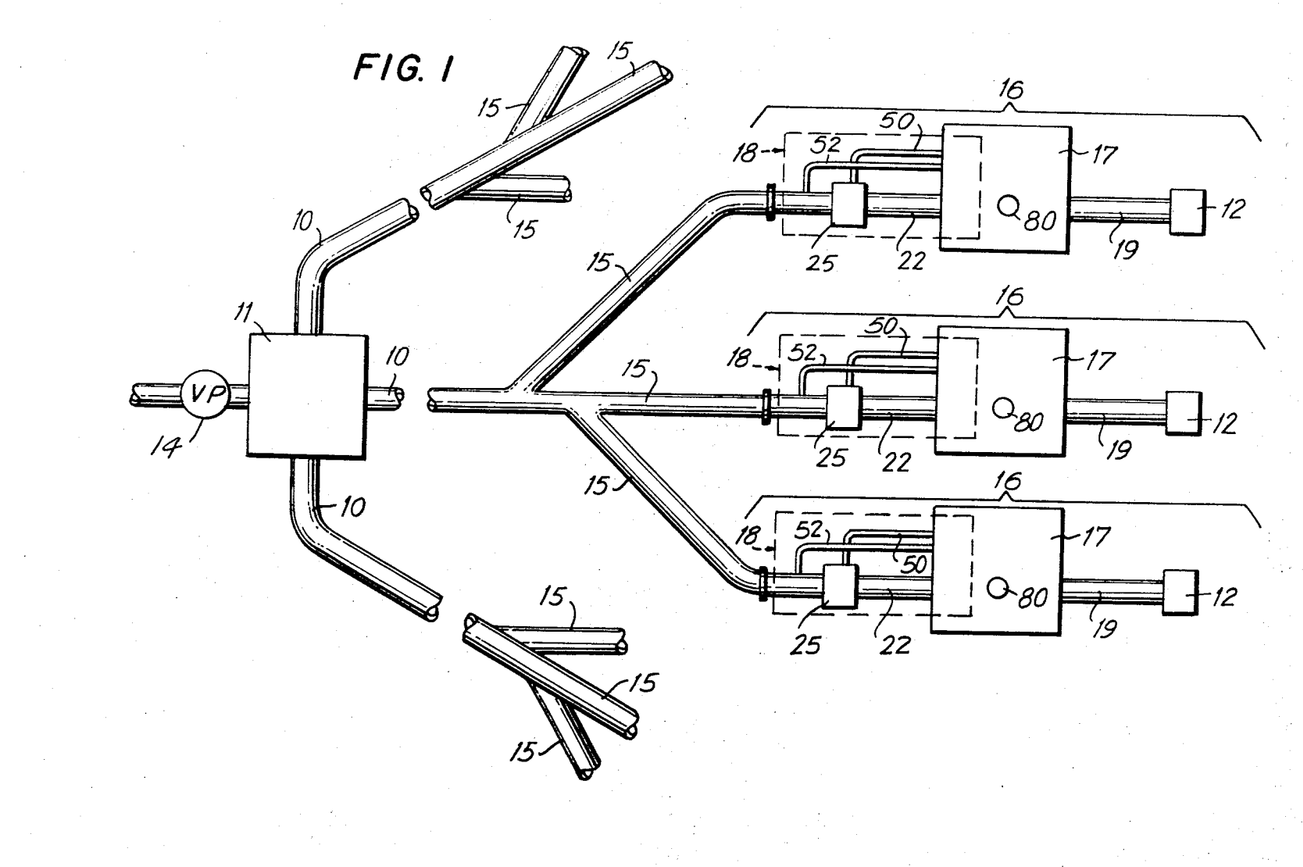
FIG. 1 is a schematic representation of a pneumatic liquid disposal system embodying my invention.

In FIG. 1 I have shown my invention embodied in a pneumatic sewage or liquid disposal system having one or more primary conduits or pipe lines 10 for conducting waste liquid to a receiving tank 11 from sanitary conveniences 12, such as bathtubs and wash basins, for example. The pneumatic sewage or liquid disposal system is maintained under partial vacuum which may be one-half of atmospheric pressure, for example, in any suitable manner. As seen in FIG. 1, a vacuum pump 14 is connected to the receiving tank 11.

The waste liquid from the sanitary conveniences 12 is conducted through branch lines or secondary conduits 15 to the primary pipe lines 10. The sanitary conveniences 12 associated with each branch line 15 form part of an operating unit 16 of the system which includes a vessel 17 for receiving waste liquid and flow control mechanism 18 for controlling the discharge of waste liquid into the branch lines 15 from the vessels 17 which may be referred to as septic tanks.

Figure 2:
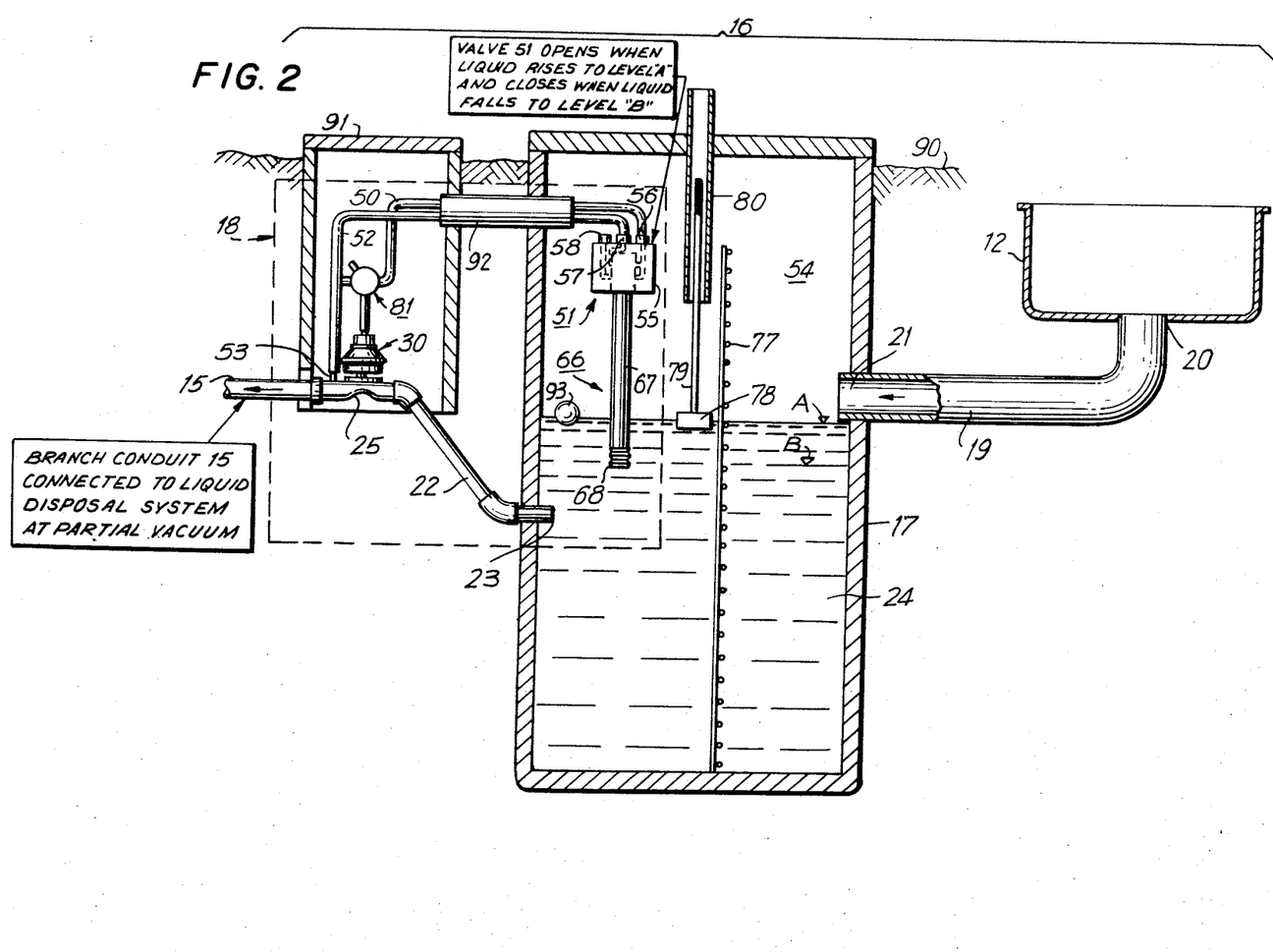
FIG. 2 is an elevation view, partly in section, of flow control structure which is schematically represented in FIG. 1 and embodies the invention to prevent flow of unwanted air into the liquid disposal system.

As shown in FIG. 2, each operating unit 16 includes a conduit 19 through which liquid flows from an outlet 20 of a sanitary convenience or place 12 to an inlet 21 of the vessel 17 and a discharge conduit 22 having its inlet end connected to an outlet 23 of the vessel 17 and its opposite discharge end connected to a branch pipe line or conduit 15.

Figure 3:
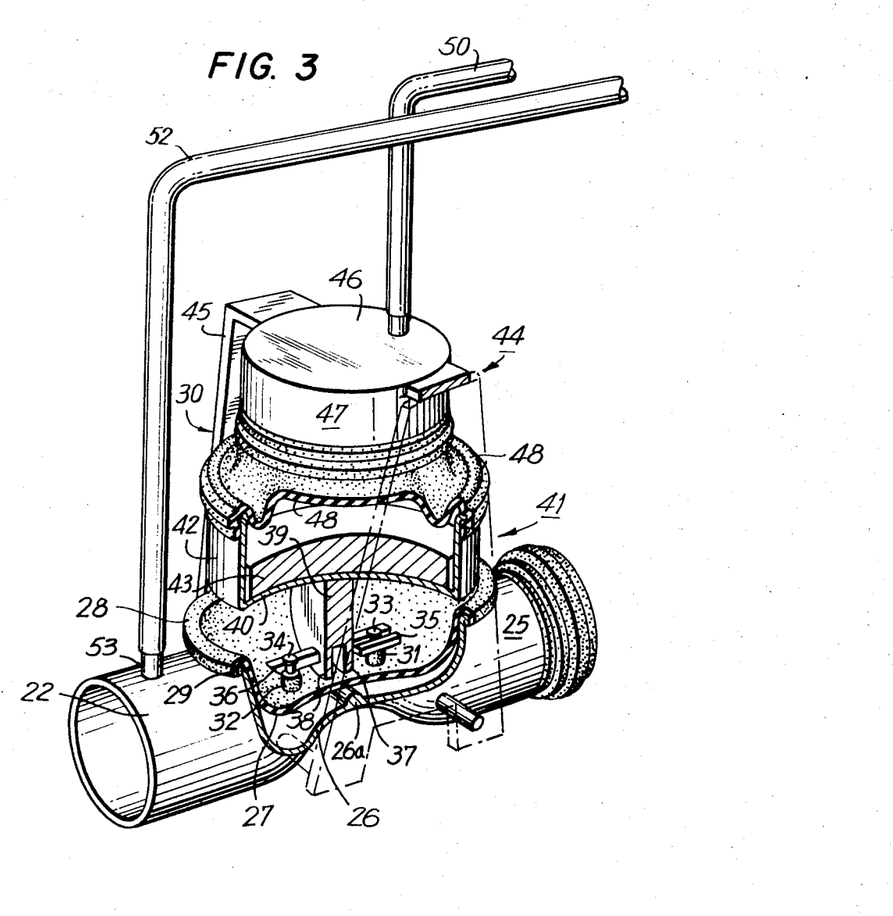
FIG. 3 is an enlarged perspective view, partly in section, of the main pneumatically-operated valve unit shown in FIG. 2 which coacts with the control valve operable responsive to liquid level.

The flow control mechanism 18 is operatively associated with the discharge conduit 22 which opens when the body of liquid 24 in the vessel 17 rises to the level A and closes when it falls to the level B. The flow control mechanism 18 includes a main valve 25 coupled in the discharge conduit 22. As seen in FIG. 3, the valve 25 is embodied in a section of the discharge conduit 22 having an oval-shaped opening in the top thereof and an inverted U-shaped bottom 26 at the region of such top opening. A ridge 26a, which is transverse to the longitudinal axis of the conduit 22, extends inward therefrom about the conduit between the opposing edges of the top opening.

An elastic wall 27 of the shape shown in FIG. 3 is positioned at the top opening of the conduit 22. The elastic wall 27, which may be formed of rubber, for example, is provided with a flange 28 which fits in an airtight manner over an outwardly bent edge 29 about the top opening in the conduit 22. The elastic wall 27 serves as a valve member of the valve 25 and is movable between closed and open positions to control the discharge of waste liquid from the discharge conduit 22 into the branch pipe line or conduit 15 forming a part of the pneumatic liquid disposal system.

Figure 4:
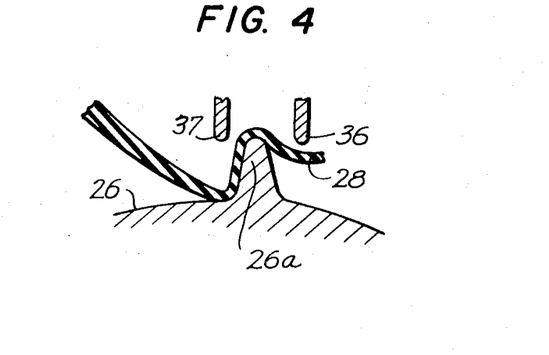
FIG. 4 is an enlarged fragmentary sectional view of parts shown in FIG. 3 to illustrate details more clearly.

A device 30 operates the main valve 25 and moves the elastic valve member 27 between its closed and open positions. In FIG. 3 it will be seen that the elastic valve member 27 is formed with bosses 31 and 32 in which lifting buttons 33 and 34 are vulcanized. The buttons 33 and 34 coact with pairs of spaced horizontal bars 35 and 36 which are fixed to and project from two arms 37 and 38 of the operating device 30. The arms 37 and 38 have bottom edges of semicircular form which, along their entire lengths, can engage the elastic valve member 27 and press the latter into sealing engagement with the bottom 26 of the conduit 22 at opposing sides of the ridge 26a, as shown in FIG. 4.

The arms 37 and 38 are formed at the periphery of a plate 39 which depends downward from and is fixed to the bottom 40 of an upright cylindrical-shaped vessel 41 having a side wall 42 and in which a metal weight 43 is positioned. Another inverted U-shaped vessel 44 is disposed above and spaced from the vessel 41.

The vessel 44 is supported in a fixed position in any suitable manner, as by a frame 45, for example, and includes a top 46 and a side wall 47 extending downward therefrom. The bottom edge of the side wall 47 of vessel 44 and top edge of the side wall 42 of the vessel 41 are connected by a member 48 of annular shape which is formed of a suitable resilient material like rubber, for example. The annular-shaped member 48 is secured to the side walls 42 and 47 in an airtight manner.

When the operating device 30 is connected to a region at a partial vacuum in a manner that will be explained presently, the vessel 41 will move upward with respect to vessel 44 due to the resilient connection 48 therebetween. When this occurs the plate 39 and arms 37 and 38 will be moved upward and lift the buttons 33 and 34, thereby lifting the elastic valve member 27 from its closed or seated position in the conduit 22.

Conversely, when the operating device 30 is connected to a region at a higher pressure, such as atmospheric pressure, in a manner that will be explained presently, the vessel 41, with the aid of the weight 43, will move downward with respect to the vessel 44 due to the resilient connection between the vessels. When this occurs the plate 39 will be moved downward and the arms 37 and 38 will exert force against the elastic valve member 27 and move it firmly against the bottom 26 of the conduit 22 at opposing sides of the ridge 26a.

The main valve 25 and operating device 30 just described are generally like those described in U. S. Pat. No. 3,482,267 to Sven A. J. Liljendahl, granted Dec. 9, 1969. The disclosure in the aforementioned Liljendahl patent may be considered as being incorporated in this application, and, if desired, reference may be made thereto for a detailed description of the main valve 25 and operating device 30.

The operating device 30 is connected by a conduit section 50, a control valve 51 and a conduit 52 to a region 53 of the discharge conduit 22 which is at a partial vacuum and downstream from the main valve 25. In a manner that will be described presently the operating device 30 is connected by conduit section 50 and passageway means formed in the control valve 51 to the space 54 above the liquid level in the vessel 17 and will be influenced by the pressure prevailing in the latter which is at atmospheric pressure.

Figure 5:
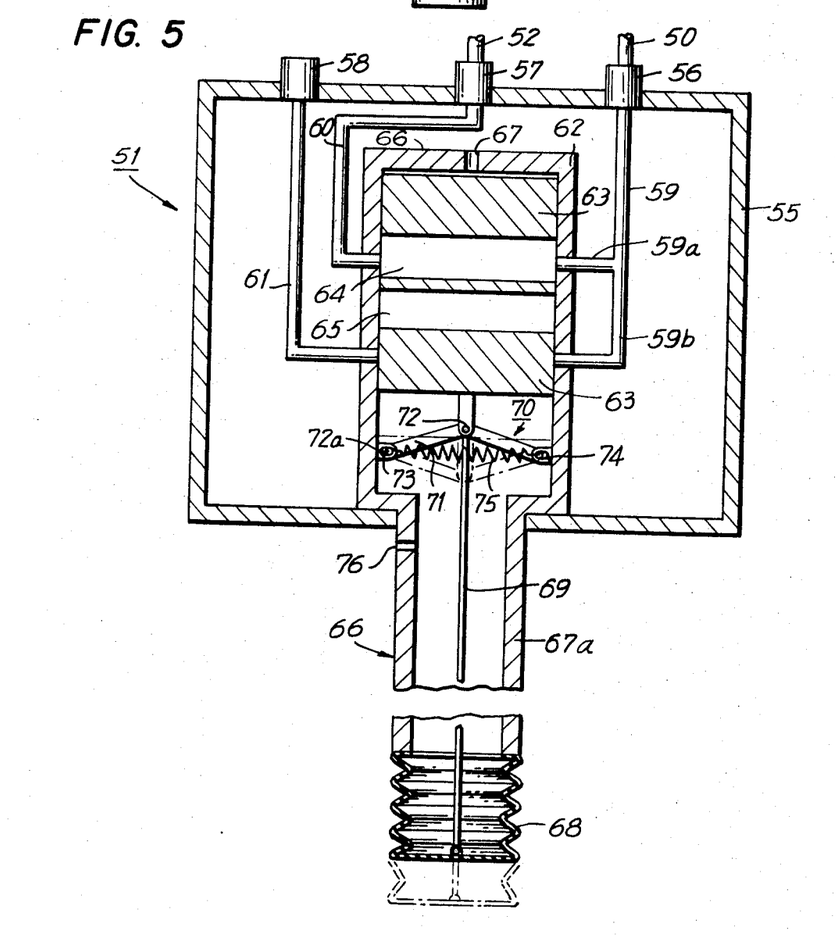
FIG. 5 is an enlarged fragmentary sectional view diagrammatically illustrating the control valve shown in FIG. 2 operable responsive to liquid level.

As seen in FIG. 5 the control valve 51 comprises a shell 55 having hollow bosses or nipples 56, 57 and 58, the conduit sections 50 and 52 being connected to the bosses 56 and 57, respectively, and the boss 58 being in communication with air at atmospheric pressure in the space 54.

The bosses 56, 57 and 58 are connected by tubing 59, 59a, 59b, 60 and 61 to apertured regions of a hollow sleeve 62 vertically disposed within the shell 55. A valve member 63 having a pair of passageways 64 and 65 therein is vertically movable within the sleeve 62 between upper and lower positions. The control valve 51 is open when the valve member 63 is in its illustrated upper position at which time it bears against the upper closed end 66 of the hollow sleeve 62 which is formed with a vent opening 67. When the control valve 51 is open the conduit sections 50 and 52 are connected to one another and the operating device 30 is in communication with the region 53 of the discharge conduit 22 which is at a partial vacuum. This connection between the conduit sections 50 and 52 includes the boss 56, tubing 59 and 59a, passageway 64 in the valve member 63, tubing 60 and boss 57. When the connection just described is completed the elastic valve member 27 of the main valve 25 moves to its open position, as previously explained.

The control valve 51 is closed when the valve member 63 moves downward from its illustrated upper position in FIG. 5. When the control valve 51 is closed the conduit sections 50 and 52 are disconnected from one another and the operating device 30 is in communication with the space 54 in which air at atmospheric pressure is present. This connection includes the conduit section 50, boss 56, tubing 59 and 59b, passageway 65 in the valve member 63, tubing 61 and boss 58.

The control valve 51 is operable responsive to the liquid level in the vessel 17 and opens when the liquid level rises to the level A and closes when the liquid falls to the level B. As shown, the control valve 51 is operatively connected to a device 66 which functions to move valve member 63 between its upper and lower positions responsive to hydrostatic pressure of liquid in the vessel 17.

By way of example the device 66, as diagrammatically shown in FIG. 5, may comprise a hollow tube 67a which extends downward from the control valve 51 and is connected to the hollow sleeve 62 and at its lower end is fixed to an expansible and contractible bellows 68. A rod 69 extending axially through the tube 67a is connected at its upper and lower ends to the valve member 63 and to the bottom of the bellows 68, respectively.

When the liquid in the vessel 17 reaches the level A the hydrostatic pressure of the liquid head acting on the bellows 68 is sufficient to contract the latter and cause the valve member 63 to move to its illustrated upper position described above, whereby the control valve 51 will open and render the operating device 30 operable to open the main valve 25. When this occurs the partial vacuum prevailing in the discharge conduit 22 becomes effective to suck and withdraw waste liquid from the vessel 17. As the liquid in the vessel 17 falls the hydrostatic pressure acting on the bellows 68 decreases whereby the latter expands and causes the valve member 63 to move to its lower position described above, whereby the control valve 51 will close and the operating device 30 becomes effective to close the main valve 25 in the manner previously explained. When the main valve 25 now is closed the partial vacuum in the branch conduit 15 no longer is transmitted to the vessel 17 through the discharge conduit 22 and the liquid in the vessel will remain at the level B which is above the level of the outlet 23.

Snap-acting mechanism 70 can be employed in the device 66 to effect opening of the control valve 51 when the liquid rises to the level A and closing thereof when the liquid falls to the level B. The snap-acting mechanism may comprise a pair of levers 71 having their inner ends pivotally connected at 72 to the rod 69 and their outer ends provided with pins 72a movable in elongated slots 73 formed in lugs 74 fixed to the side wall of the hollow sleeve 62. A coil spring 75 is connected at its ends to the pins 72a and functions to promote axial movement of the rod 69 after the levers 71 pass dead center. Hence, the snap-acting mechanism 70 functions to keep control valve 51 in its closed position until the force developed by the bellows 68 at the liquid level A is sufficient to move the levers 71 past their dead center position at which time the coil spring 75 becomes effective to move rod 69 upward to cause the valve member 63 to move to the position illustrated in FIG. 5.

Conversely, the snap-acting mechanism 70 functions to keep control valve 51 in its open position until the force developed by the bellows 68 at the liquid level B is sufficient to move the levers 71 past their dead center position at which time the coil spring 75 becomes effective to move the rod 69 downward to cause the valve member 63 to move to its lower position at which the passageway 65 is in communication with the tubing 59 and 59b and 60. A vent opening 76 may be provided in the wall of the tube 67 so that the interior of the device 66 will be at atmospheric pressure.

As shown in FIG. 2, the vessel 17 is provided with a coarse grating 77 which is vertically disposed therein and extends upward from the bottom of the vessel to a height well above the liquid level A. The grating 70 is disposed between the inlet 21 and outlet 23 of the vessel 17 so that all waste liquid must flow therethrough.

For visually indicating the level of the liquid body 24 a float 78 is provided in the vessel 17. A rod 79 which functions as a level indicator is fixed to the float 78 and extends upward therefrom through an open-ended hollow tube 80 which is fixed to the top of the vessel 17 and extends therethrough. When the liquid level in the vessel 17 becomes abnormally high the rod 79 will project above the upper end of the tube 80 and indicate that the flow control mechanism is not functioning properly.

A valve 81 is provided for manually rendering the operating device 30 operable at will to open the main valve 25. As diagrammatically shown in FIG. 6, the valve 81 includes a jacket 82 which is connected in the conduit section 50 at 83 and 84. A cross connection 85 connects the conduit section 52 to the jacket 82 at 86.

Figure 6:
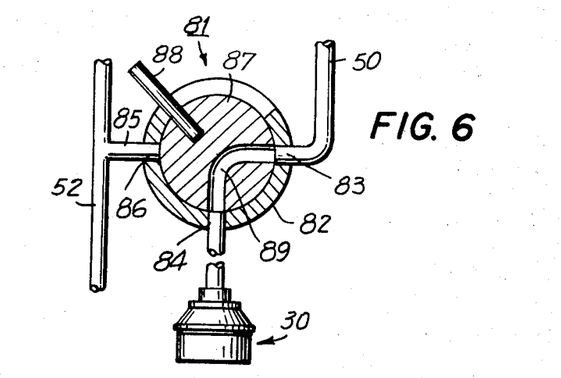
FIG. 6 is an enlarged fragmentary sectional view diagrammatically illustrating the manually operable valve shown in FIG. 2 operatively associated with the flow control structure.

A plug 87, which is rotatable within the jacket 82, is provided with an operating handle 88 to connect conduit section 52 to the conduit section 50 through the cross connection 85. The plug 87 is formed with a passageway 89 which, as shown in FIG. 6, is in such a position that the operating device 30 will be connected to the control valve 51 and the latter will function to control the flow control mechanism responsive to the liquid level in the vessel 17, as explained above.

When it is desired to control the operating device 30 manually to open the main valve 25, the plug 87 is turned clockwise 90° by the handle 88 whereby the ends of the passageway 89 are in communication with the apertured regions 84 and 86 of the jacket 82. Under these conditions the full effect of the partial vacuum at the region 53 of the discharge conduit 22 will be transmitted to the operating device 30 through the conduit section 52, cross connection 85 and passageway 89 of the plug 87. When the plug 87 now is turned counterclockwise 90° by the handle 88 the plug will again be in the position illustrated in FIG. 6 and the operating device 30 will function in a normal manner responsive to the level of the liquid in the vessel 17.

In FIG. 2 it will be seen that the vessel 17 is installed below ground level indicated at 90. The main valve 25 and operating device 30 therefor, and the manually operable valve 81, can be installed in a vessel or well 91 which is below ground level. The conduit sections 50 and 52 can pass between the well 91 and vessel 17 below ground level. A hollow duct 92 can be provided between the well 91 and vessel 17 through which the conduit sections 50 and 52 can pass.

In the event the flow control mechanism 18 malfunctions and the liquid in the vessel 17 falls to the level of the outlet 23, and at such time the discharge conduit 22 is in communication with the branch line 15 of the system, air in the vessel can be drawn by suction into the discharge conduit 22 and flow into the pneumatic liquid disposal system through the branch line. When this occurs the partial vacuum developed and maintained in the system will be impaired and often can be inadequate to propel waste liquid pneumatically into other branch lines 15 of the system from the vessels 17 of other operating units 16 in which such liquid collects.

In accordance with my invention I provide structure which is independent of the flow control mechanism 18 and operable to prevent air in the vessel 17 from flowing through the outlet 23 thereof due to suction in the discharge conduit 22 when the control mechanism 18 malfunctions and the liquid level in the vessel 17 falls to a level at the vicinity of the outlet 23. I accomplish this by providing a body 93 in the vessel 17 which is capable of floating freely in the body of liquid 24 therein. The floating body 93 in a broad sense serves as a valve member and functions independently of the flow control mechanism 18.

When the liquid surface in the vessel 17 falls the floating body 93, due to the fact that it floats freely in the body of liquid 24, also will fall at the same rate that the liquid surface falls. Since the liquid withdrawn by suction from the vessel 17 through the discharge conduit 22 moves toward the outlet 23, such movement of the liquid induces the floating body 93 to move toward the discharge conduit 22 and it will be near the outlet 23 as the liquid level approaches the vicinity of the outlet.

When a partial vacuum prevails in the discharge conduit 22 due to the main valve 25 being open, the floating body 93 will be drawn by suction against the outlet 23 in airtight sealing relation therewith. In this way the floating body 93 is held fast to the outlet 23 before any air in the vessel 17 can flow therefrom into the discharge conduit 22 and pass into the branch line 15 of the system.

When the faulty operation of the flow control mechanism 18 has been corrected and the mechanism functions properly in the manner explained above, the main valve 25 will close and suction no longer will be transmitted to the outlet 23. Under these conditions the floating body 93 no longer is held fast to the outlet 23 and can move therefrom and move upward responsive to rise of liquid in the vessel 17.

It will be understood that the floating body 93, which in the preferred embodiment shown is spherical, can assume other shapes. In any particular case, the shape and specific weight of the floating body are desirably chosen so that it will always be held fast in sealing relation with the outlet 23 when the flow control mechanism 18 malfunctions.

Figure 7:
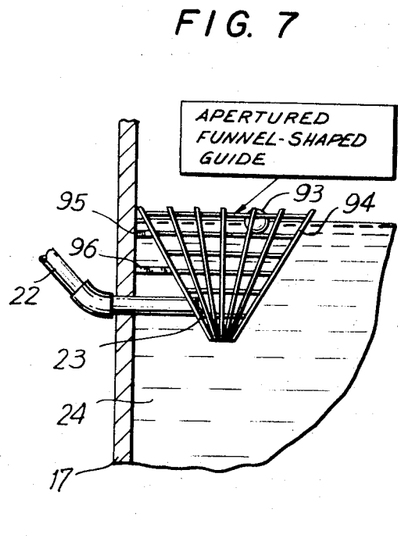
FIGS. 7 to 10 are fragmentary view of flow control structure like that shown in FIG. 1 illustrating modifications of the invention.
Figure 8:
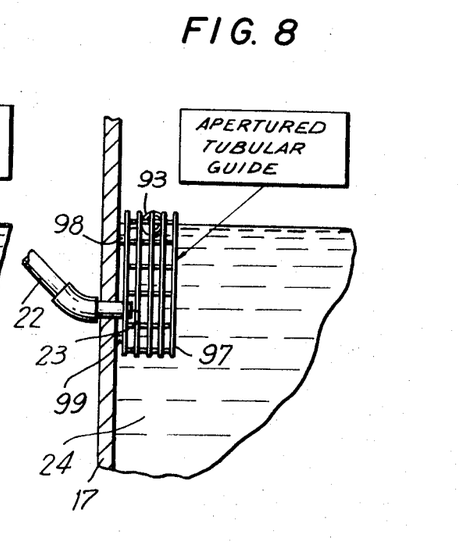

In the event the consistency of the body of liquid 24 is such that the floating body 93, for one reason or another, does not move with certainty toward the outlet 23 in airtight sealing relation therewith, structure can be employed for guiding the floating body 93 toward the outlet 23. A tubular member or funnel formed of apertured material, such as coarse grating or netting, for example, can be employed for such guiding structure. For example, in FIG. 7 an apertured funnel 94 is mounted by brackets 95 and 96 to the side wall of the vessel 17 for guiding the floating body 93 to the outlet 23; and in FIG. 8 an apertured tubular guide 97 is mounted by brackets 98 and 99 to the side wall of the vessel 17 for guiding the floating body 93 to the outlet 23. When structure is employed for guiding the floating body 93, the floating body and outlet 23 with which it coacts can assume a variety of different forms and shapes.

Figure 9:
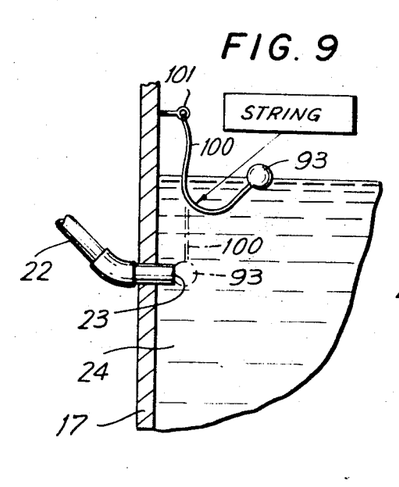
Figure 10:
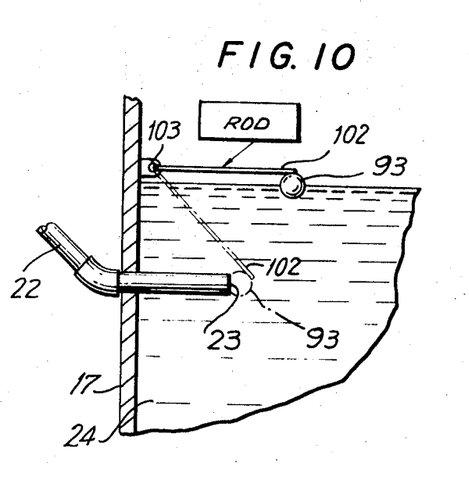

Other ways of guiding the floating body 93 to the outlet 23 are illustrated in FIGS. 9 and 10. In FIG. 9 the floating body 93 is fixed to the outer end of string or light cord 100, the inner end of which is fixed to an eye bolt 101 mounted at the correct height to the side wall of the vessel 17. In FIG. 10 the floating body 93 is fixed to the outer end of a rod 102, the inner end of which is pivotally mounted on a bracket 103 at the side wall of the vessel 17.

In the event it is deemed desirable to employ a floating body that is relatively light and will displace less liquid and float relatively high at the liquid surface, the main valve 25 can be located at a level below the outlet 23 or the discharge conduit 22 can be provided with a pocket depending downward from the outlet exteriorly of the vessel 17. Under these conditions liquid always will flow into the discharge conduit 22 and be propelled therethrough by vacuum prevailing in the branch line 15. In this manner the liquid surface level in the vessel 17 always will fall sufficiently for the floating body 93 to be drawn by suction against the outlet 23 in airtight sealing relation therewith and prevent flow of air from the vessel into the discharge conduit 22 when the flow control mechanism malfunctions. In this way the operation of other operating units 18 will not be impaired by flow of unwanted air into the system which reduces the partial vacuum or negative pressure prevailing in the system and renders the system ineffective to propel waste liquid pneumatically into the branch lines from the vessels of other operating units.

I claim:

1. The combination with a pneumatic liquid disposal system which is adapted to be maintained at a partial vacuum, of
   a. a vessel adapted to receive liquid, said vessel having an outlet at a first level,
   b. a discharge conduit for connecting the outlet of said vessel to the system,
   c. valve means in said discharge conduit which is normally closed,
   d. control mechanism including first means responsive to the partial vacuum in the system for opening said valve means and second means for rendering said first means operable when the liquid level in said vessel is at a second level which is above the first level, and
   e. structure which is independent of said control mechanism and operable to prevent air in said vessel from flowing through the outlet thereof when said control mechanism malfunctions and the outlet is in communication with the system and the liquid in said vessel falls to a level at the vicinity of the first level.

2. Apparatus as set forth in claim 1 in which said structure independent of said control mechanism and operable to prevent air in said vessel from flowing through the outlet thereof comprises a valve member.

3. Apparatus as set forth in claim 2 in which said valve member is inoperable during normal operation of said control mechanism and becomes operable to prevent air in said vessel from flowing through the outlet thereof responsive only to fall of liquid in said vessel to the level at the vicinity of the first level.

4. Apparatus as set forth in claim 1 in which said structure independent of said control mechanism comprises a body capable of floating in the body of liquid.

5. Apparatus as set forth in claim 4 in which said body capable of floating functions as a valve member.

6. Apparatus as set forth in claim 5 in which the outlet of said vessel is defined by means which provides a seat for said valve member when the liquid in the vessel falls to the level at the vicinity of the first level.

7. The combination with a pneumatic liquid disposal system which is adapted to be maintained at a partial vacuum, of
   a. a plurality of operating units operatively associated with the system for collecting waste liquid and for discharging such liquid therefrom into the system,
   b. each of said operating units comprising a vessel which has an inlet to receive waste liquid and an outlet at a first level,
   c. each of said outlets being connected by a discharge conduit to the system,
   d. valve means in each of said discharge conduits which is normally closed,
   e. mechanism for controlling each of said valve means, each control mechanism including first means responsive to the partial vacuum in the system for opening said valve means associated therewith and second means for rendering said first means operable when the liquid level in said vessel associated therewith is at a second level which is above the first level, and f. a plurality of said operating units each having structure which is independent of its control mechanism and operable to prevent air in said vessel in each such unit from flowing through the outlet thereof when said control mechanism malfunctions and the outlet is in communication with the system and the liquid level in such vessel falls to a level at the vicinity of the first level, so that flow of air from such vessel into the system will be prevented and ineffective to adversely impair the operation of said other units.

8. Apparatus as set forth in claim 7 in which each of said independent structures operable to prevent air in one of said vessels from flowing through its outlet comprises a valve member.

9. Apparatus as set forth in claim 8 in which each of said valve members is inoperable during normal operation of one of said control mechanisms and becomes operable to prevent air in said vessel from flowing through its outlet responsive only to fall of liquid in said vessel to the level at the vicinity of the first level.

10. Apparatus as set forth in claim 7 in which each of said independent structures comprises a body capable of floating in the body of liquid in one of said vessels.

11. Apparatus as set forth in claim 10 in which each of said floating bodies functions as a valve member.

12. The combination with a pneumatic liquid disposal system which is adapted to be maintained at a partial vacuum, of
   a. a vessel adapted to receive liquid, said vessel having an outlet at a first level,
   b. a discharge conduit for connecting the outlet of said vessel to the system,
   c. valve means in said discharge conduit which is normally closed,
   d. control mechanism including first means responsive to the partial vacuum in the system for opening said valve means and second means for rendering said first means operable when the liquid level in said vessel is at a level which is in a normal range above the first level, and
   e. structure which is independent of said control mechanism and operable to prevent air in said vessel from flowing through the outlet thereof when said control mechanism malfunctions and the outlet is in communication with the system and the liquid in said vessel falls from the normal range to a level at the vicinity of the first level.

13. Apparatus as set forth in claim 12 in which said second means of said control mechanism renders said first means thereof operable to open said valve means when the liquid level in said vessel is at the upper end of said normal range and renders said first means inoperable to open said valve means when the liquid level in said vessel is at the lower end of said normal range.

14. Apparatus as set forth in claim 13 in which said structure independent of said control mechanism comprises a body capable of floating in the body of liquid.

15. The combination with a pneumatic liquid disposal system which is adapted to be maintained at a partial vacuum, of
   a. a plurality of operating units operatively associated with the system for collecting waste liquid and for discharging such liquid therefrom into the system,
   b. each of said operating units comprising a vessel which has an inlet to receive waste liquid and an outlet,
   c. each of said outlets being connected by a discharge conduit to the system,
   d. valve means in each of said discharge conduits for controlling discharge of waste liquid from said vessels to the system,
   e. mechanism for controlling each of said valve means,
   f. each of said mechanisms for controlling a different one of said valve means being operable responsive to change in the liquid surface level of the body of liquid in one of said vessels,
   g. a plurality of said vessels each having a body which is capable of floating in the body of liquid therein, and
   h. said floating bodies being so constructed and formed that, when the liquid surface level of the body of liquid in which any one of said bodies is floating falls sufficiently, said floating body will be drawn by suction toward the outlet of said vessel in which said floating body is disposed and move into airtight sealing relation therewith, so that flow of air from such vessel into the system will be prevented and the operation of said other units will not be impaired.

16. Apparatus as set forth in claim 15 in which said valve means are normally closed and each of said mechanisms includes first means responsive to the partial vacuum in the system for opening a different one of said valve means and second means for rendering said first means operable when the liquid surface level of the body of liquid in any one of said vessels is at a given level above its outlet.

17. The combination with a pneumatic liquid disposal system which is adapted to be maintained at a partial vacuum, of
   a. a plurality of operating units operatively associated with the system for collecting waste liquid and for discharging such liquid therefrom into the system,
   b. each of said operating units comprising a vessel which has an inlet to receive waste liquid and an outlet,
   c. each of said outlets being connected by a discharge conduit to the system,
   d. valve means in each of said discharge conduits for controlling discharge of waste liquid from said vessels to the system,
   e. mechanism for controlling each of said valve means,
   f. each of the mechanisms for a different one of said valve means being operable responsive to the partial vacuum in the system,
   g. a plurality of said vessels each having a body which is capable of floating in the body of liquid therein, and
   h. said floating bodies being so constructed and formed that, when the liquid surface level of the body of liquid in which any one of said bodies is floating falls sufficiently, said floating body will be drawn by suction toward the outlet of said vessel in which said floating body is disposed and move into airtight sealing relation therewith, so that flow of air from such vessel into the system will be prevented and the operation of said other units will not be impaired.

* * * * *